United States Patent [19]
Beltrami

[11] Patent Number: 6,048,191
[45] Date of Patent: Apr. 11, 2000

[54] MACHINE FOR FLATTENING PASTRY OR DOUGH

[76] Inventor: Lauro Beltrami, Via G. Cesare 26, 41012 Carpi (MO), Italy, 41012

[21] Appl. No.: 08/913,427
[22] PCT Filed: Sep. 7, 1995
[86] PCT No.: PCT/IT95/00147
  § 371 Date: Sep. 16, 1997
  § 102(e) Date: Sep. 16, 1997
[87] PCT Pub. No.: WO96/28979
  PCT Pub. Date: Sep. 26, 1996

[30] Foreign Application Priority Data

Mar. 20, 1995 [IT] Italy .................................. MO95A0042

[51] Int. Cl.⁷ ................................ A21C 11/00; B30B 7/00
[52] U.S. Cl. ............................... 425/394; 425/89; 425/411
[58] Field of Search .............................. 425/394, 89, 403, 425/411, 408, 322, DIG. 5

[56] References Cited

U.S. PATENT DOCUMENTS 4,696,823  9/1987  DeChristopher ....................... 426/496
5,074,778 12/1991  Betts, Jr. et al. ....................... 425/394
5,176,922  1/1993  Balsano et al. ........................... 425/89
5,204,125  4/1993  Larsen ..................................... 425/298

FOREIGN PATENT DOCUMENTS

0 463 221  1/1992  European Pat. Off. .
0 532 786  3/1993  European Pat. Off. .
  466881  6/1972  United Kingdom ................... 425/322

Primary Examiner—Robert Davis
Assistant Examiner—Thukhanh T. Nguyen
Attorney, Agent, or Firm—Young & Thompson

[57] ABSTRACT

A machine which is appropriate to flatten pastry or dough and to obtain disks of different diameter size or thickness with or without peripheral edge. The machine is used for preparing typical dishes, such as: pizza pies, tarts, cakes, piadine romagnole, tigelle, montanare, etc. The characteristic feature of the machine is that of having realized a device which, by imitating manual work, flattens a pastry ball without squeezing it, starting from the center towards the periphery, without modifying the characteristic softness, uniformity and rising capacity which are typical of manually manipulated pastry or dough.

13 Claims, 8 Drawing Sheets

MACHINE FOR FLATTENING PASTRY OR DOUGH

This application is a National Stage application of PCT/IT95/00147, filed Sep. 7, 1995.

TECHNICAL FIELD

The present invention relates to a machine employed for rolling or flattening pastry or dough and for shaping it into circular disks provided with an unpressed peripheral edge, preferably used to produce and prepare pizza pies, tarts, cakes, etc.

BACKGROUND ART

Machines and devices designed for rolling pastry to be used for making pizza pies, are already known. However, they have two drawbacks:

- the pastry or dough is not flattened or rolled in the same way as during manual kneading, instead it is pressed, thereby giving the pastry features which lower the quality of the final product after baking;
- the sheet of pastry does not have an edge projecting upwardly (which must be evident and more spongy than the remaining part of the dough after baking), and said edge must be manually formed by the pizza chef around the periphery of the sheet of pastry which was obtained by the machine.

In practice, there does not exist a machine and/or a device which rolls or flattens pastry into circular disks provided with a peripheral edge, regardless the diameter of the disk, and which in any case can provide a peripheral edge in which the pastry is neither squeezed nor cracked.

SUMMARY OF THE INVENTION

Disclosure of Invention

The object of the present invention is to provide a machine suited for preparing disks of pastry used for making pizza pies, which allows realization of disks of different diameters, always having a peripheral edge, and with features, like sponginess of pastry, identical to those of pizza pies manually prepared by skilled pizza chefs.

The present machine also allows preparation of a disk of pastry without a peripheral edge, in order to manufacture other characteristic products like the so-called "piadina romagnola", and "tigella montanara" etc. According to the present invention this object is attained by a device of the aforementioned kind, characterized in that it comprises two disks or plates: a lower one which is rotated by a motor and on whose upper face there are added or formed spiral-like helices, and an upper plate or disk which does not rotate and which is formed either by a set of circular rings which are concentric and axially mutually sliding each one more inwardly with respect to the preceding one, or by radial sectors which are hinged to a central part.

The upper plate or disk is lowered parallel with respect to the lower one while the latter is rotated. While bringing the two plates nearer to each other the mass of pastry put between the plates, at their center, is gradually flattened starting from the center towards the outside, and a peripheral edge formed by the pastry which has not yet been flattened will always be present. The amount of pastry which has been interposed between the plates or disks, and the stopping of the lowering of the upper plate at a suitable instant, will set the dimension of the disk diameter and its thickness.

BRIEF DESCRIPTION OF THE DRAWINGS

For a better understanding of the invention, two embodiments thereof will now be described, referring to the annexed drawings, which are illustrative and non limitative and in which.

DESCRIPTION OF THE PREFERRED EMBODIMENTS

In FIGS. 1 to 13 there is shown a first embodiment of a machine for rolling or flattening pastry, in order to prepare circular disks of pastry of variable thickness provided or not with a peripheral edge, wherein the machine includes the improvements of the present invention. With reference to FIGS. 1 to 8, reference numeral 1 denotes the bed of the machine inside which the ratio-motor 2 is located and fixed, said motor being used for rotating the lower disk 3 including one or more projecting spirals 4 which are either composed of added material or are directly obtained from the disk. A sheet 5, of a suitable kind, adheres to the spirals and is fixed to the bed 1.

Figure 1:
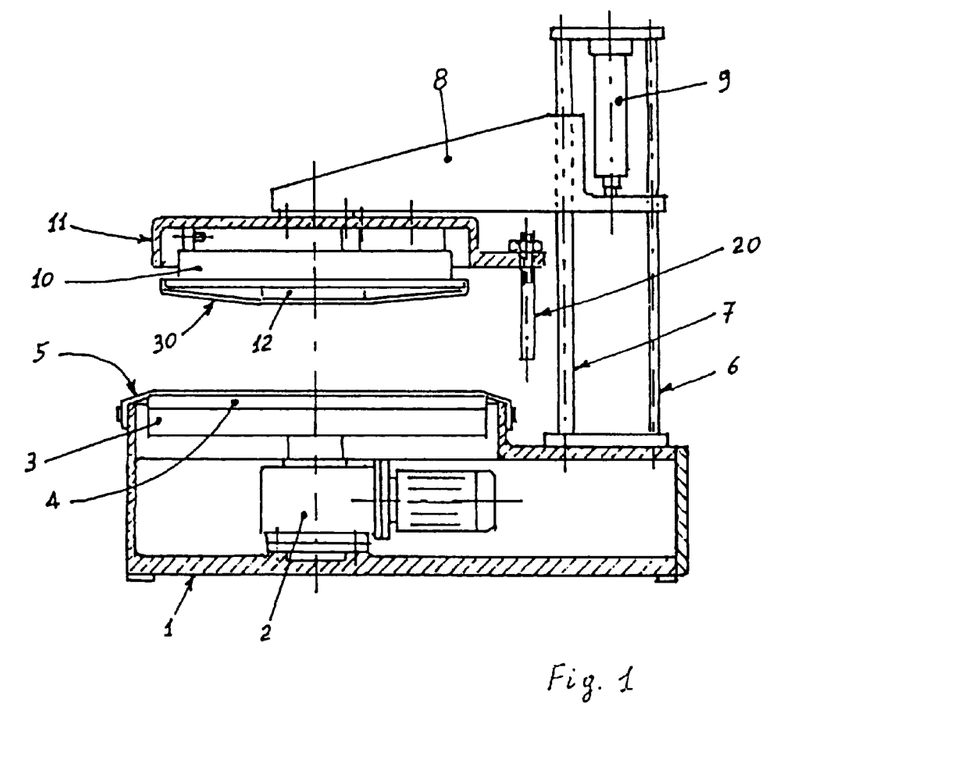
FIG. 1 schematically shows the machine of the present invention, according to a partial sectional diametrical view along the plane indicated by I—I in FIG. 2.
Figure 2:
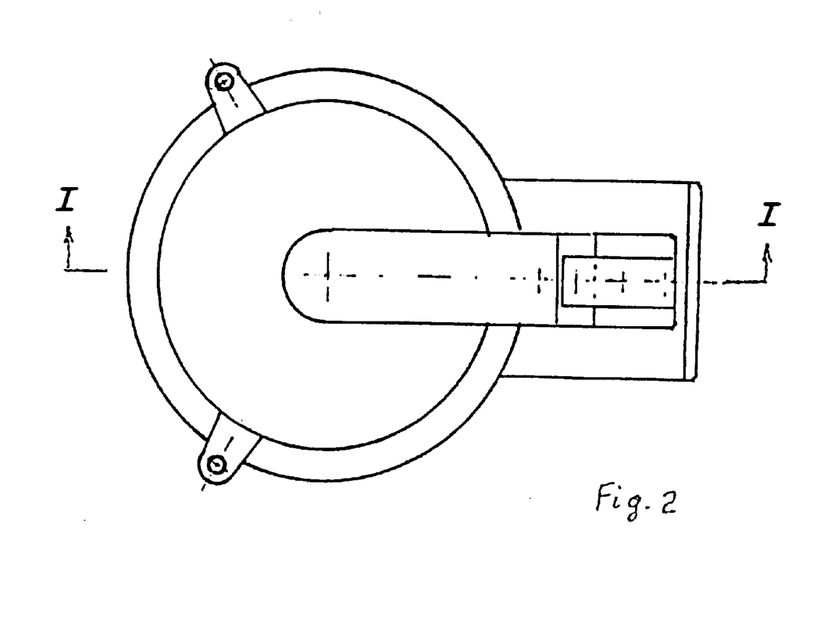
FIG. 2 is a plan view of FIG. 1.
Figure 3:
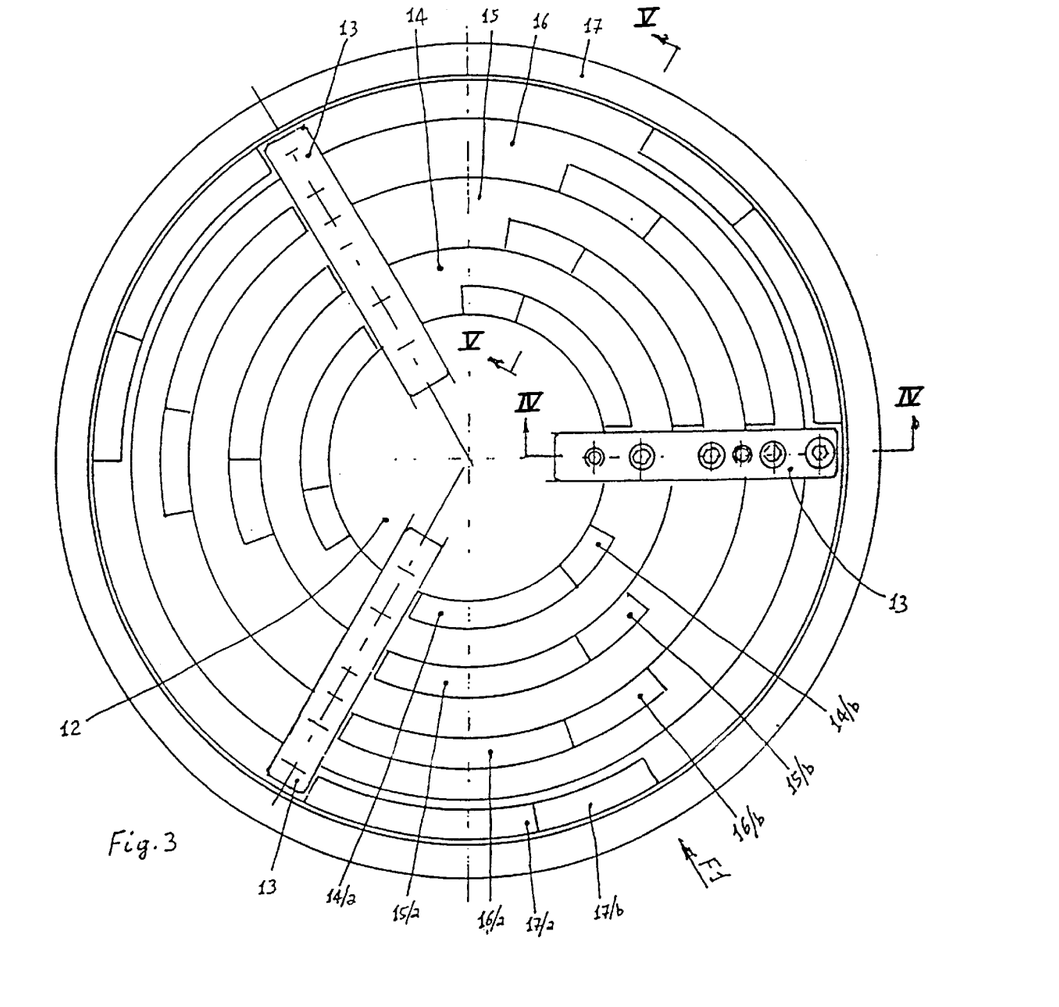
FIG. 3 shows, according to a plan view, the particular form of the upper plate or disk, according to a first embodiment employing circular concentric rings.
Figure 4:
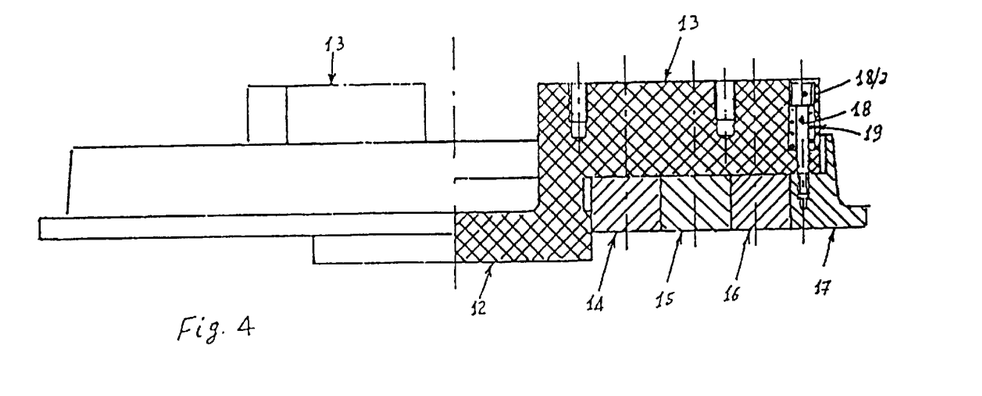
FIG. 4 is a diametrical cross section of the upper plate, obtained along the plane indicated by IV—IV in FIG. 3.

On the bed 1 there are fixed two vertical guide rods 6,7 on which the bracket 8 can slide, being driven by a linear actuator 9. The bracket 8 supports the upper plate 10, which mainly comprises, according to a first embodiment:

a cover 11 fixed to the bracket 8;

a central plate 12 provided with one or more brackets 13 which support circular rings 14,15,16,17 by means of screws 18 which are screwed in them and whose head 18/a slides inside seats obtained in the brackets 13; torsion springs in the form of helicoidal springs 19 acting between the bottom of said seat and the head of the screws 18, forcing the rings 14,15,16,17 to abut the lower surface of said brackets 13. The rings 14,15,16,17 are concentric to the central plate 12 and slide axially on each other. The brackets 13 are in contact With the cover 11 and are fixed to it.

Figure 5:
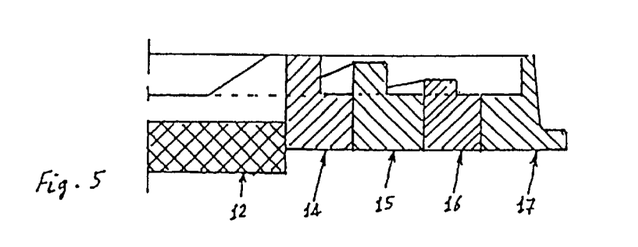
FIG. 5 is a diametrical cross section of the upper plate or disk, according to the plane indicated by V—V in FIG. 3.
Figure 6:
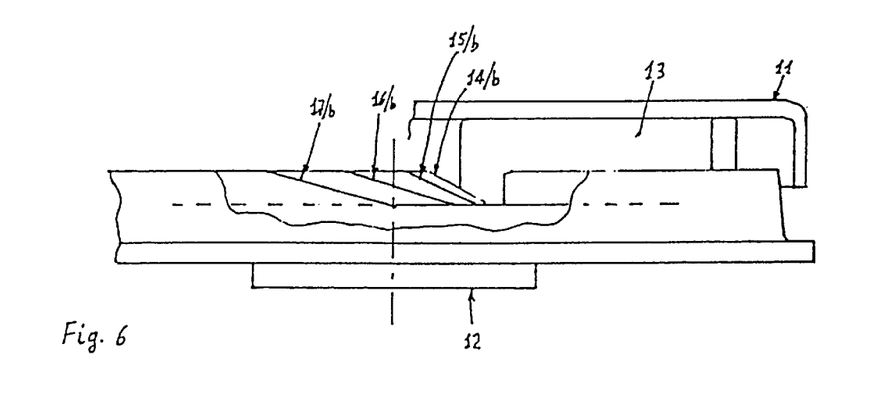
FIG. 6 is a view of FIG. 3 in the direction of the arrow VI.

On each ring 14,15,16,17 there are obtained or added three (projecting) sectors 14/a,15/a,16/a,17/a which start by forming a slope 14/b,15/b,16/b,17/b which provided a tapered variable thickness, thereby acting like a cam or eccentric contoured surface (see also FIGS. 5,6).

On the cover 11 there are mounted three adjustable thin bearing rods which will contact three bearing points provided on the bed 1 when the actuator 9 lowers the bracket 8. The adjustment of said thin bearing rods sets the distance at which the central plate 12 is stopped With respect to the spiral 4 of the lower plate or disk, and therefore also the final thickness of the disk of pastry or dough which must be obtained.

Centrally, in a suitable hub provided on the cover 11, there is inserted a small spindle 21 (FIG. 8) on those upper end there is formed (or mounted) a toothed pinion 22 associated to a rack 23 driven in both directions by a linear oleodynamic actuator 24 fixed to the cover 11. Three arms 25 (FIG. 8) are interposed between the inner surface of the cover 11 and the circular rings 14,15,16, 17, said arms being connected to a small block 26 which supports them, this block being fixed to the spindle 21. On each arm 25 there are inserted six wheels (or radial bearings), two of them, idler wheels denoted by 27 and 28, are in contact only with the inner plane of the cover 11, whereas the other four wheels can interact only with the cam-like sectors 14/b,15/b,16/b, 17/b when, by means of the linear actuator 24, the small spindle 21 is rotated in the direction of the arrow F2, together with the corresponding wheel supporting arms 25.

Figure 8:
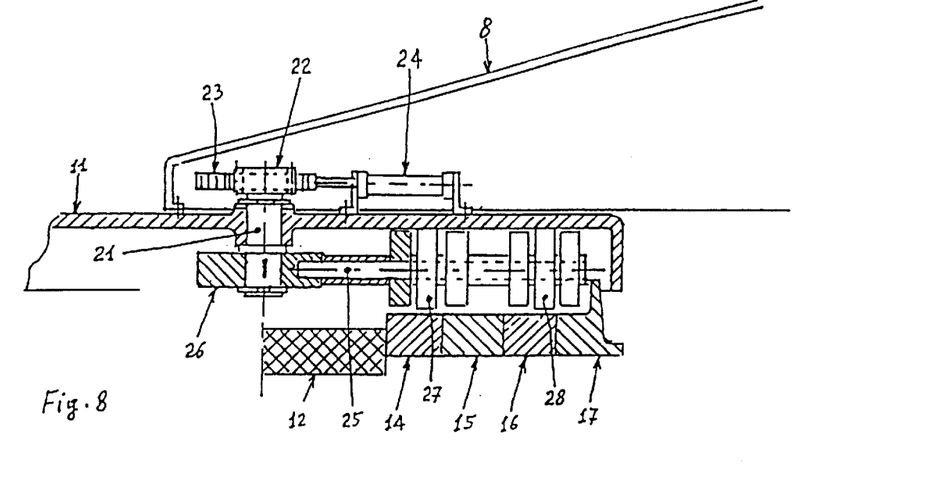
FIG. 8 is a sectional diametrical view of the upper plate or disk, along the plane VIII—VIII of FIG. 7, and it schematically shows the device which allows to lowering one after the other the different circular rings making up the upper plate.

Thereby, each set of three wheels (one for each arm 25) acts on the cams of the same ring, which lowers until it is flush with the small central plate 12. On the rings, the cam-like sectors are disposed in sequence so that each ring starts lowering when the preceding one is already flush with the small central plate 12.

The two small wheels 27,28 which bear on the cover 11, on its inside, prevent the arms 25 from bending upwardly due to the thrust transmitted to the wheels interacting with the cam-like sectors.

A disk made of TEFLON (polyterafluroethylene) coated cloth 30 may cover both the small central plate and the circular rings. If the central small plate and the circular rings are manufactured with great precision and with a material suited for foodstuffs, it is possible to avoid use of the cloth 30. Thereby, when the plates or disks are separated from each other, each circular ring acts as a separating means in the sense that it assists in detaching the pastry or dough from the adjacent ring (if it adheres to it).

Figure 7:
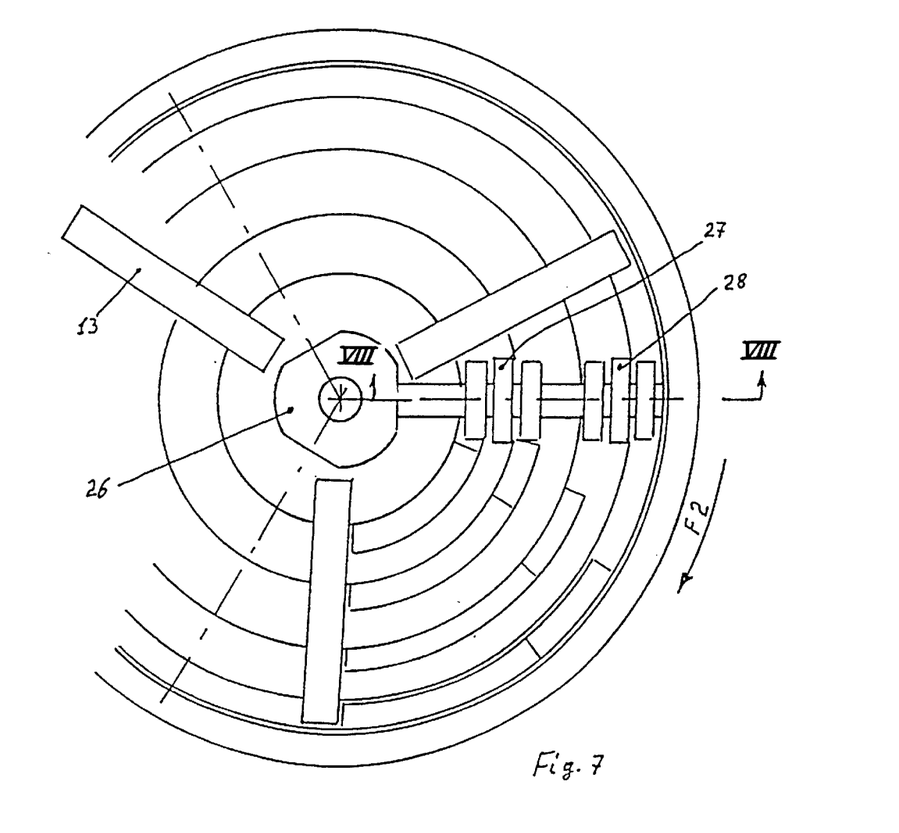
FIG. 7 is a plan view of the upper plate, identical to FIG. 3, in which there is also shown the device including the idle wheels, used to push the cams of the rings which make up the plate or disk itself.

In the rest position, the small wheels are not in contact with the cam-like sectors (FIG. 7).

The operation of the device is the following: after starting the ratio-motor 2 by means of an appropriate oleodynamic actuator control unit (not shown) which may or may not be incorporated in the machine, the actuator 9 lowering the bracket 8 is operated; when the small bearing rods 20 bear on the bed 1 and the descent stroke is stopped, the pressure inside the oleodynamic circuit increases; a sequence valve which has been calibrated to a preset value opens itself and operates the linear actuator 24 which rotates the spindle 21, causing the successive lowering of the rings 14,15,16,17. It is obvious that the lowering may be stopped at any time, that is:

immediately after the small bearing rods 20 touch the bed;

after lowering of the first ring 14;

and so on.

Figure 9:
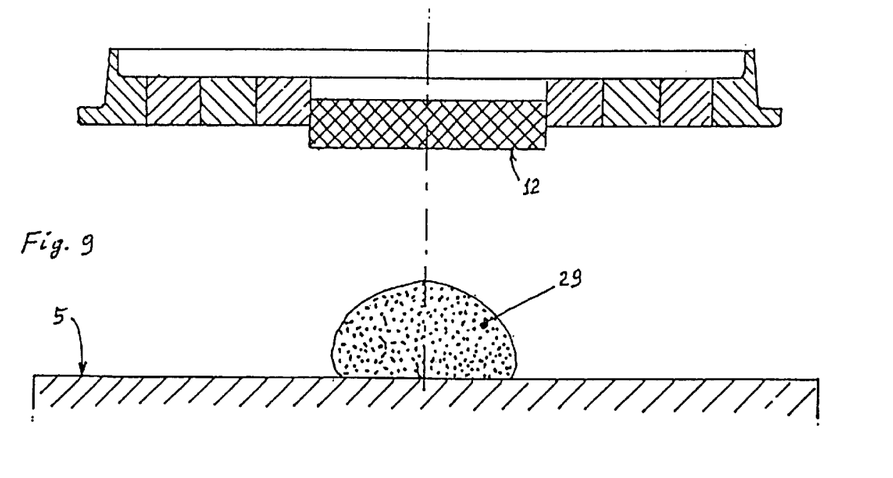
FIGS. 9 to 12 schematically show successive steps of the cycle for flattening the pastry, and how the peripheral edge in the disk of pastry is formed according to the first embodiment.
Figure 10:
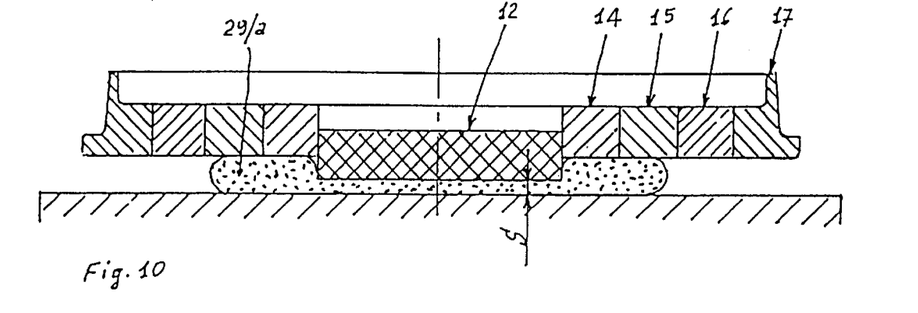
Figure 11:
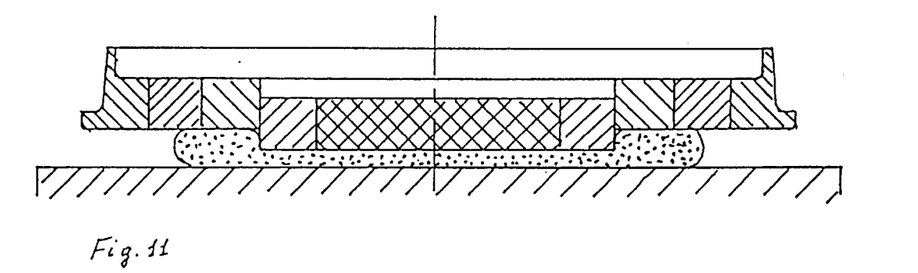
Figure 12:
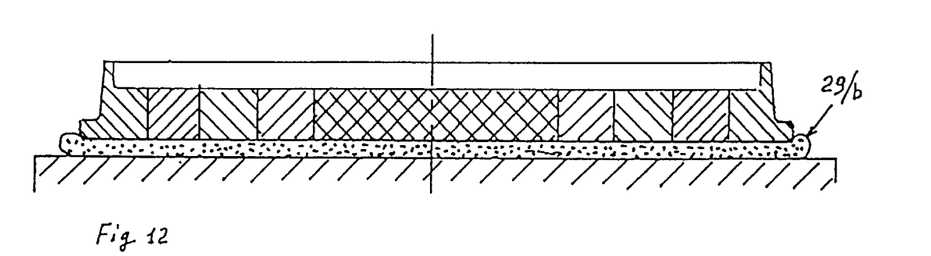
Figure 13:
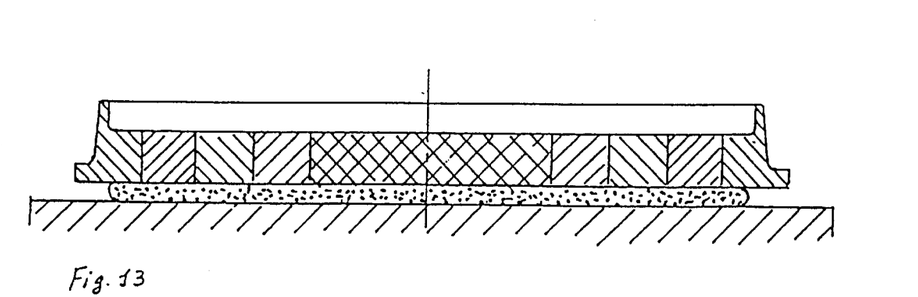
FIG. 13 shows the preparation of a disk of pastry or dough having no edge.
Figure 14:
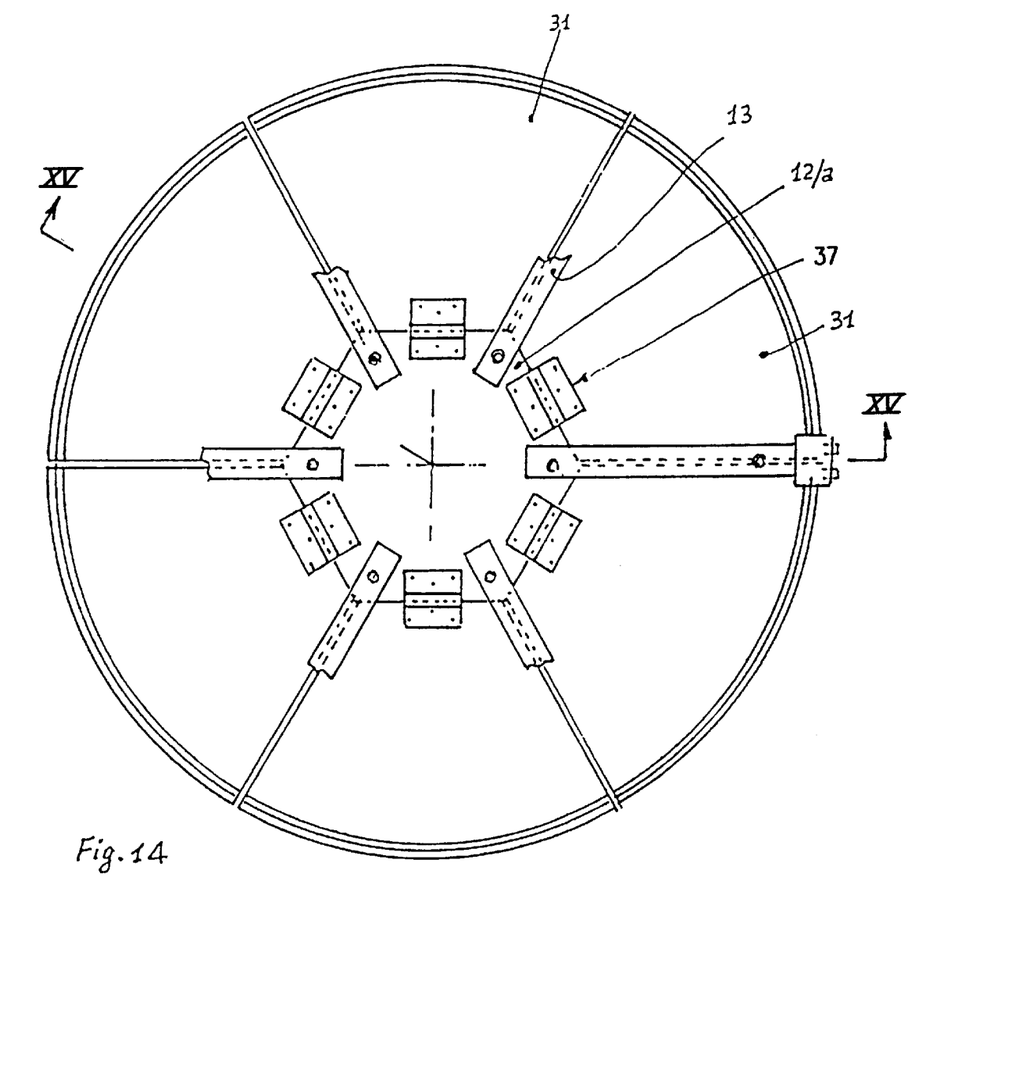
FIG. 14 shows according to a top view of the particular construction of the upper plate of the second embodiment of a machine for rolling pastry, of a kind comprising radial hinged sectors, which is also suited to realize the invention.
Figure 15:
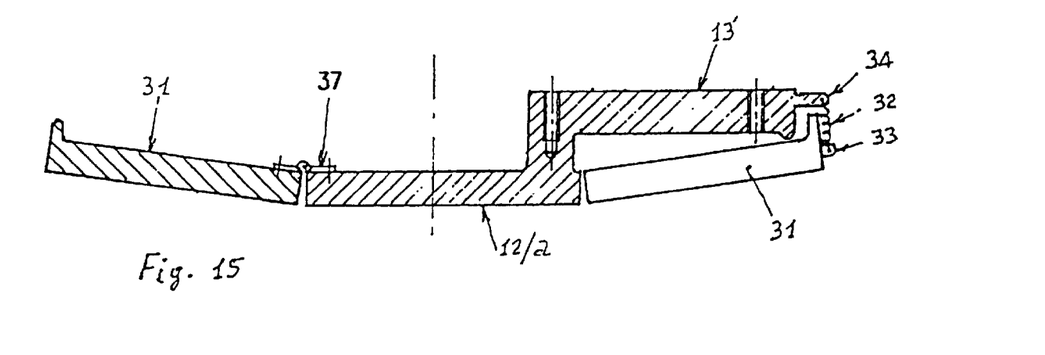
FIG. 15 is a diametrical section of the upper plate, obtained along the section segment indicated by XV—XV in FIG. 14.

FIGS. 9 to 12 show the manufacturing cycle of the disks of pastry:

when the machine is not running, or when the ratio-motor 2 and the oleodynamic actuator control unit are started, a piece of pastry 29 is put at the center of the lower plate (FIG. 9);

the actuator 9 is operated. When the small bearing rods 20 stop on the bed 1, the pastry 29 has flattened as shown in FIG. 10 and forms a central zone (whose diameter equals the diameter of the small central plate 12) having already the desired final thickness "S" which is set by the adjustment of the small bearing rods 20, and a large edge 29/a which is composed of the mass of pastry in excess;

when the sequence valve starting linear actuator 24 it released, the first ring 14 lowers (FIG. 11), and successively all the remaining ones, until the final situation depicted in FIG. 12 is reached, wherein the disk of pastry has a corresponding small final edge 29/b.

By varying the pastry amount 29 and the thickness "S", it is possible to obtain:

disks of pastry, comprising an edge, of as many different diameter sizes as the number of rings increased by one. In the illustrated example we have five disks of different diameter, for making pizza pies or tarts;

disks of different diameter size but without edge (FIG. 13), for the preparation of cakes, "tigelle montanare", "piadine", etc.

This embodiment, as shown and described above, is not the only one possible.

Accordingly, a machine for flattening or rolling pastry according to the present invention, may be different than the kind comprising circular concentric axially slidable rings, but of a kind including hinged sectors (FIGS. 14 to 17), wherein 12/a denotes the central small plate, which in the present case has an hexagonal form and is provided with six brackets 13' to fix it to the cover 11. To the central small plate 12/a there are connected, through hinges 37, a plurality of sectors 31 which are peripherally raised by means of traction springs 32 acting between hooks 33, mounted on or integral with sectors 31, and hooks 34, which are fixed to or integral with the brackets 13'. On each sector 31, in a similar way as has been done for the rings 14,15,16,17 of the previously described embodiment, a tapered variable thickness cam 35/a,35/b is added to or formed integral with the sector, whereon a wheel 36 acts, whereas a small idler wheel 28, which is also freely rotatable, rolls bearing on the inside surface of the cover 11, as in the previous embodiment.

Figure 16:
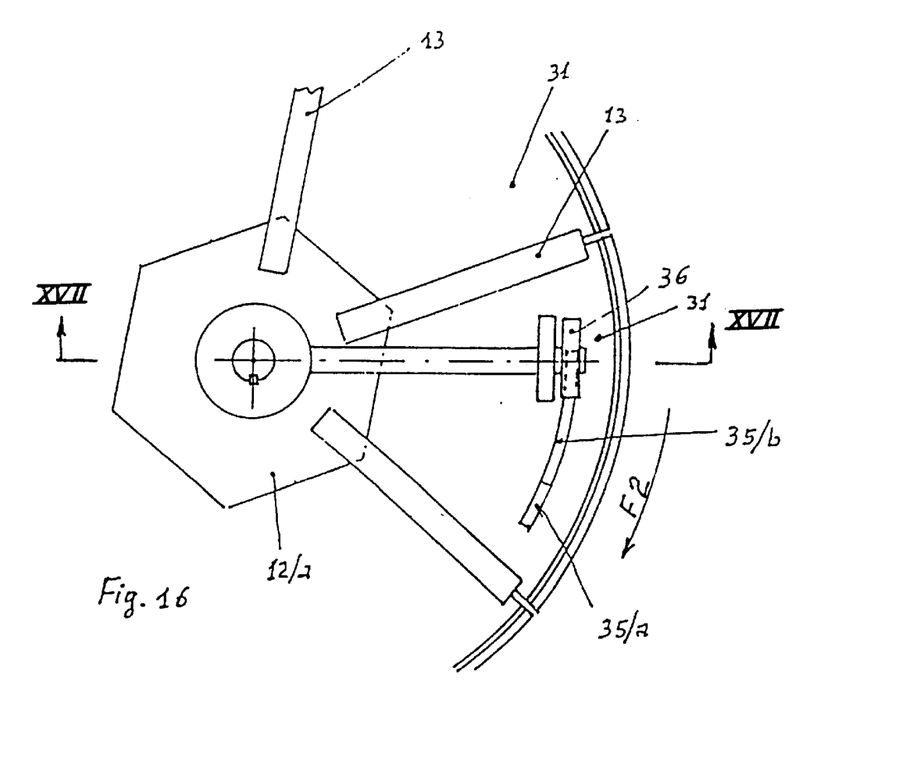
FIG. 16 is a top view of the upper plate, identical to FIG. 14, in which the device comprising the idler wheels is also shown, and which is used to press the cams or projections of the sectors which make up the plate itself.
Figure 17:
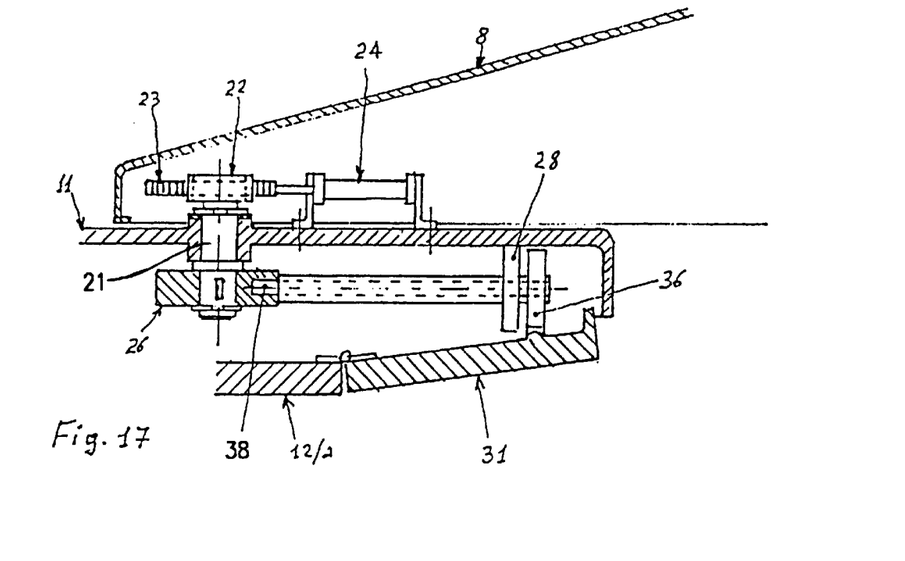
FIG. 17 is a diametrical cross section of the upper plate, along the plane denoted by XVII—XVII in FIG. 16, and it schematically shows the device which allows to gradually lowering of the different sectors composing the upper plate.
Figure 18:
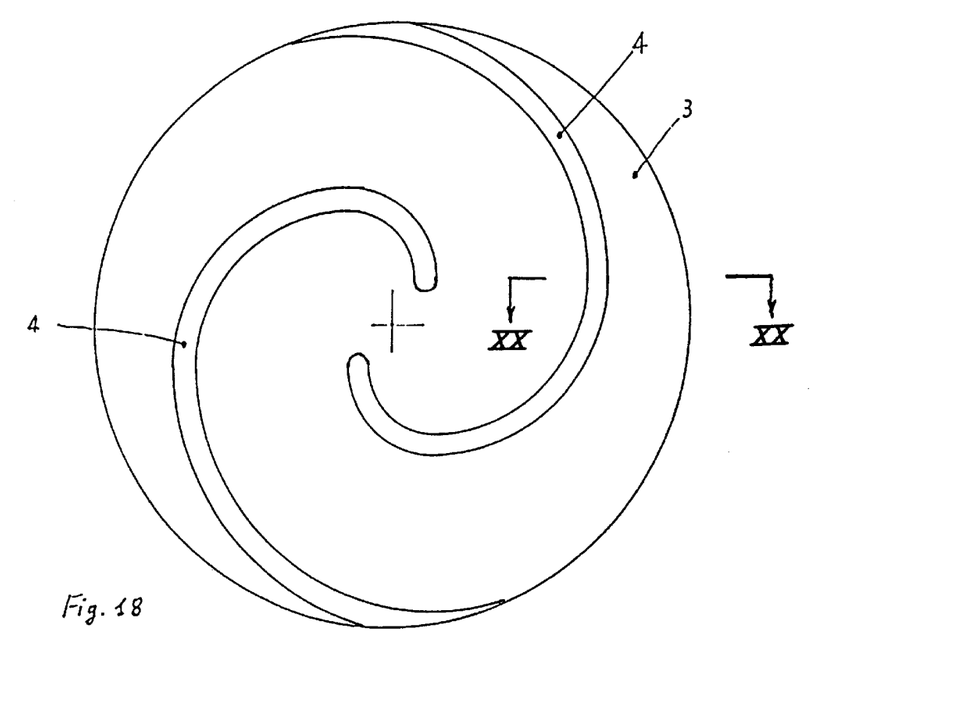
FIGS. 18 and 19 respectively show, in detail, according to two orthogonal views, a side view and a top view of the lower disk provided with spiral-like helices.
Figure 19:
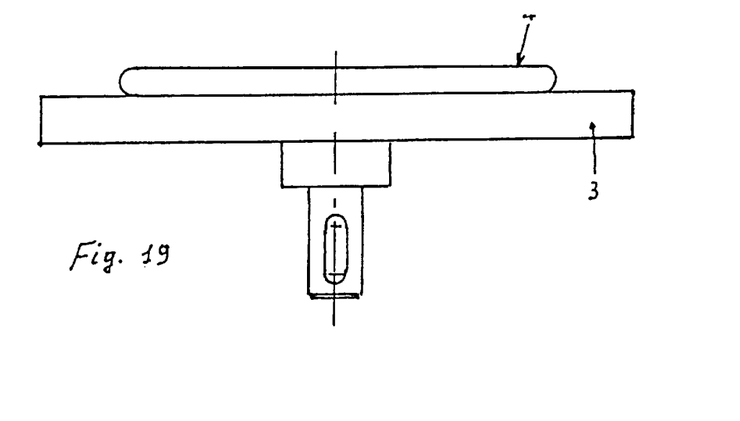
Figure 20:
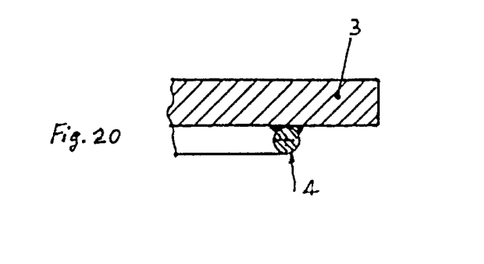
FIG. 20 is a diametrical cross section along the plane denoted by XX—XX in FIG. 18 and shows in detail how the projecting spirals may be formed on the disk. In the different figures, the same alphanumeric reference signs denote the same parts or elements.

The small idler wheel 28 and wheel 36 are mounted on the arms 38, which are mounted and driven by means of the linear actuator 24 and the rack 23, exactly in the same way as in the embodiment employing concentric circular rings, for the purpose of gradually lowering the sectors 31, when the pastry is to be flattened starting from the center towards the periphery.

As may be observed, both embodiments are similar: in the embodiment employing pivoting sectors, their number may be different from six; the thickness of the pastry is always determined through the adjustment of the small bearing rods 20, and the pastry is gradually flattened from the center towards the periphery as the sectors are lowered through the thrust of the small wheels on the variable thickness cam-like sectors.

Substantially, the operation of the machine is the same as that already described for the embodiment employing circular concentric rings.

In both embodiments, the lower disk 3 carrying the spirals 4 plays a fundamental role, influencing the flattening of the pastry and the execution time. The number of turns to impart to the lower disk 3 is determined by the number of spirals 4 which are present on its face, and by the property of the mixture composing the pastry. If necessary, the ratio-motor 2 may be replaced by a stepless speed change gear or by a ratio-motor combined with a change gear with many speed levels.

Industrial Applicability

The two embodiments which have been shown and described refer to the realization of machines employed in pizza-restaurants, restaurants, snack-bars, etc. The operational principles which are illustrated by them, that is a lower rotating plate provided with spirals forming projections and an upper plate formed by concentric rings or sectors, may be used to realize automatic plants (or lines) for the industrial production of pizza-pies (for instance).

An automatic line is an automatized multiple station transfer machine wherein in the lower part of every station there is provided a motor driven lower disk or plate 3 carrying spirals 41 in the upper part of every station there is a plate or disk whose central small plate 12 or 12/a has a diameter size which becomes larger for each successive station according to the desired number of passages or stations which, as established in advance, divides up the cycle for flattening the pastry.

The advantages with respect to the present industrial production lines of pizza-pies, are the following:

the yield and heating of the pastry are as low as possible since the flattening or rolling of the pastry is divided up in more steps;

the period of every cycle is reduced to the time required for a single step, with an obvious noticeable increase of productivity. As will be obvious from the description given above of two preferred embodiments, the invention is not limited to the example mentioned, which has been presented only for illustrative purposes. It must be understood that other steps, examples, constituent parts and methods of operation will spontaneously originate in the mind of one skilled in the art after an attentive reading of the present disclosure, even if this is not to be considered unrelated to the scope of the invention as the latter is claimed hereinafter:

I claim:

1. A machine for flattening dough, comprising:

a rotatable lower disk having an upper surface with at least two raised spirals thereon that extend from a center part of the upper surface to a peripheral part of the upper surface;

means for rotating said lower disk;

an upper headpiece comprising plural movable sections that have lower surfaces that are movable into and out of a first plane that is spaced from and parallel to the upper surface, and at least one arm that pivotally moves in an arc parallel to the first plane, said at least one arm having an extension that urges the lower surfaces of said movable sections into the first plane; and means for moving said upper headpiece perpendicular to the first plane.

2. The machine of claim 1, wherein each of said movable sections comprises an interior surface opposite the lower surface, each said interior surface having a ramped wheel path thereon, and wherein said extension comprises a wheel that moves along the ramped wheel path when said at least one arm is moved.

3. The machine of claim 2, wherein said arm further comprises an idle wheel for maintaining the parallel movement of said arm.

4. The machine of claim 1, wherein said upper headpiece comprises a central section, and wherein each of said movable sections is hinged to said central section and has a peripheral edge remote from said central section that moves perpendicular to the first plane under the urging of said extension.

5. The machine of claim 4, wherein each of said movable sections is generally wedge-shaped.

6. The machine of claim 1, wherein said movable sections are annular and concentric, and wherein said at least one arm comprises one said extension for each of said movable sections.

7. The machine of claim 6, wherein each of said movable sections comprises an interior surface opposite the lower surface, each said interior surface having a ramped path thereon on which said extension moves when said at least one arm is moved.

8. The machine of claim 7, comprising three of said arms, and wherein each said extension comprises a wheel that moves along the respective ramped wheel path when said arms are moved.

9. A machine for flattening dough, comprising:

a rotatable lower disk having an upper surface with at least two raised spirals thereon that extend from a center part of the upper surface to a peripheral part of the upper surface;

means for rotating said lower disk;

an upper headpiece comprising, a central section having a lower surface that is movable into and out of a first plane that is spaced from and parallel to the upper surface, plural, generally wedge-shaped movable sections that are pivotally connected to said central section and have lower surfaces that are movable into and out of the first plane, and at least one arm that pivotally moves in an arc parallel to the first plane, said at least one arm having an extension that urges the lower surfaces of said movable sections into the first plane, each of said movable sections having a peripheral edge remote from said central section that moves perpendicular to the first plane under the urging of said extension, each of said movable sections comprising an interior surface opposite the lower surface, each said interior surface having a ramped path thereon along which said extension moves when said at least one arm is moved; and means for moving said upper headpiece perpendicular to the first plane.

10. The machine of claim 9, wherein said extension comprises a wheel.

11. A machine for flattening dough, comprising:

a rotatable lower disk having an upper surface with at least two raised spirals thereon that extend from a center part of the upper surface to a peripheral part of the upper surface;

means for rotating said lower disk;

an upper headpiece comprising, plural annular, concentric movable sections having lower surfaces that are movable into and out of a first plane that is spaced from and parallel to the upper surface, and at least one arm that pivotally moves in an arc parallel to the first plane, said at least one arm having an extension for each of said movable sections that urges the respective lower surface into the first plane, each of said movable sections comprising an interior surface opposite the lower surface, each said interior surface having a ramped path thereon along which said extension moves when said at least one arm is moved; and means for moving said upper headpiece perpendicular to the first plane.

12. The machine of claim 11, wherein said extension comprises a wheel.

13. The machine of claim 12, wherein each said ramp path is positioned relative to an adjacent said ramped path so that the respective lower surfaces move into the first plane sequentially.

* * * * *